United States Patent
Akiona et al.

(10) Patent No.: US 11,960,302 B2
(45) Date of Patent: Apr. 16, 2024

(54) ENHANCED ROBOT FLEET NAVIGATION AND CONTROL

(71) Applicant: Accenture Global Solutions Limited, Dublin (IE)

(72) Inventors: Nicholas Akiona, Saratoga, CA (US); Oyinlola Oladiran, Greater Manchester (GB)

(73) Assignee: Accenture Global Solutions Limited, Dublin (IE)

(*) Notice: Subject to any disclaimer, the term of this patent is extended or adjusted under 35 U.S.C. 154(b) by 400 days.

(21) Appl. No.: 17/314,324

(22) Filed: May 7, 2021

(65) Prior Publication Data

US 2021/0349473 A1     Nov. 11, 2021

Related U.S. Application Data

(60) Provisional application No. 63/021,877, filed on May 8, 2020.

(51) Int. Cl.
*G05D 1/02* (2020.01)
*G05B 13/04* (2006.01)
(Continued)

(52) U.S. Cl.
CPC ........... *G05D 1/0297* (2013.01); *G05B 13/04* (2013.01); *G06F 9/505* (2013.01); *B25J 9/1671* (2013.01)

(58) Field of Classification Search
CPC ................. G05D 1/0297; G05B 13/04; G05B 19/41895; G05B 2219/40438;
(Continued)

(56) References Cited

U.S. PATENT DOCUMENTS 7,587,274 B2 * 9/2009 Kaldewey ............. G01C 21/20
                                                                701/434
9,881,397 B2   1/2018 Evennou et al.
(Continued)

FOREIGN PATENT DOCUMENTS

CN            112925308         6/2021

OTHER PUBLICATIONS

EP Extended Search Report in European Appln. No. 21172871.2, dated Sep. 14, 2021, 7 pages.
Losvik et al., "A Domain-Specific Language for the Development of Heterogeneous Multi-Robot Systems," 2019 ACM/IEEE 22nd International Conference on Model Driven Engineering Languages and Systems Companion, Munich, Germany, Sep. 15-20, 2019, 549-558.
(Continued)

*Primary Examiner* — Kira Nguyen
(74) *Attorney, Agent, or Firm* — Fish & Richardson P.C.

(57) ABSTRACT

This document describes a simulation system that simulates robots and other actors performing tasks in an area. In one aspect, a method includes obtaining a graph representing a physical area. The graph includes area nodes that represent regions of the area that are traversed by a set of actors that perform tasks in the area and terminal nodes that represent regions of the facility where the actors perform the tasks. A set of agents that each include a model corresponding to an actor is identified. At least a portion of the agents includes models for robots that perform tasks in the area. The model of an agent represents durations of time for traversing area nodes and performing tasks are terminal nodes during simulations. A sequence of tasks being performed in the area is simulated using the graph and the set of agents.

21 Claims, 5 Drawing Sheets

(51) Int. Cl.
 *G05D 1/00* (2006.01)
 *G06F 9/50* (2006.01)
 *B25J 9/16* (2006.01)

(58) Field of Classification Search
 CPC ........... G05B 2219/40446; G05B 2219/50393; G06F 9/505; B25J 9/1671; Y02P 90/02; Y02P 90/60; G06Q 10/08; G06Q 10/063
 See application file for complete search history.

(56) References Cited

U.S. PATENT DOCUMENTS

| | | | |
|---|---|---|---|
| 11,168,564 B2* | 11/2021 | Lundh | G06Q 10/04 |
| 2008/0294338 A1 | 11/2008 | Doh et al. | |
| 2010/0121567 A1 | 5/2010 | Mendelson | |
| 2010/0141392 A1* | 6/2010 | Jo | G06K 7/10039 340/10.2 |
| 2010/0203901 A1* | 8/2010 | Dinoff | H04W 4/022 455/456.3 |
| 2014/0046733 A1 | 2/2014 | Grichnik et al. | |
| 2017/0131711 A1 | 5/2017 | Thomson et al. | |
| 2018/0365347 A1 | 12/2018 | Wang et al. | |
| 2021/0116940 A1* | 4/2021 | Fukunaga | G06Q 10/063114 |
| 2021/0325862 A1* | 10/2021 | Buerger | G05D 1/0297 |
| 2022/0351133 A1 | 11/2022 | Akiona et al. | |

OTHER PUBLICATIONS

Niemczyk et al., "Adaptive Run-time Models for Groups of Autonomous Robots," 2015 IEEE/ACM 10th International Symposium on Software Engineering for Adaptive and Self-Managing Systems, Florence, Italy, May 18-19, 2015, 127-133.

"A Bi-Level Probabilistic Path Planning Algorithm for Multiple Robots with Motion Uncertainty," by Jingchuan Wang, Ruochen Tai, and Jingewen Xu, Department of Automation, Key Laboratory of System Control and Information Processing of Ministry of Education of China, pp. 1-16, Apr. 18, 2020 (Year: 2020).

"Extracting Topology-Based Maps from Gridmaps," by E. Fabrizi and A. Saffiotti, Apr. 2000 (Year: 2000).

"Learning metric-topological maps for indoor mobile robot navigation," by Sebastian Thrun, Computer Science Department and Robotics Institute, Carnegia Mellon University, pp. 21-71, Jun. 1996 (Year: 1996).

"Robotic forklifts for intelligent warehouses: Routing, path planning, and auto-localization," by Kelen C.T. Vivaldini, Jorge P.M. Galdames, Thalas S. Bueno, Roberto C. Araujo, Rafael Msobral, Marcelo Becker, and Glauco A.P. Caurin, Mobile Robotics Group, pp. 1463-1468, Apr. 2010 (Year: 2010).

"Wi-Fi Fingerprint-Based Topological Map Building for Indoor User Tracking," by Hyojeong Shin and Hojung Cha, 2010 (Year: 2010).

* cited by examiner

ENHANCED ROBOT FLEET NAVIGATION AND CONTROL

CROSS REFERENCE TO RELATED APPLICATIONS

This application claims the benefit of U.S. Patent Application No. 63/021,877, filed May 8, 2020, which is incorporated herein by reference.

TECHNICAL FIELD

This specification generally relates to robot navigation and control.

BACKGROUND

Robots are often used to perform tasks within facilities, such as warehouses and manufacturing facilities. As robots are becoming more flexible and dynamic, the gap between simulation and reality is widening due to the advancement of robots into more dynamic and flexible environments. Mobile robots now behave in more of a stochastic manner, perform dynamic processes, and operate in dynamic environments.

SUMMARY

This specification generally describes robot fleet simulation techniques that model direct and indirect interactions between robots, people, vehicles, and/or other moveable equipment or devices that are performing tasks in an area, e.g., in a facility. The robots, people, and other moveable equipment can also be referred to as the actors that performs tasks in the area. The simulation techniques can be used to predict performance metrics, e.g., the utilization of robots, and adjust the robot fleet based on the performance metrics. For example, a robot control system can adjust the allocation of tasks to robots, increase or reduce the number of active robots, and/or adjust the navigation or sequencing of robots in traveling to locations to perform tasks.

A fleet or site simulation tool can leverage discreet event simulation (DES). In such a simulation, each task that occurs is treated as an event with a set duration. When the timer for that event ends, the actor, e.g., robot or human, is free to begin another task. Although such an approach is highly scalable and makes it easy to model individual tasks, it can be overly simplistic for modeling complex, dynamic systems such as mobile robots and people that share a facility with the robots. For example, a DES approach may always indicate that tasks are performed faster with the addition of more robots, ignoring the effects of bottlenecks and gridlock caused by multiple robots and/or other actors occupying the same area. In addition, such an approach does not model coexistence-based interactions such as congestion and suffers from difficulties in capturing interactions and dependencies between multiple actors.

According to some implementations, a method includes obtaining a graph representing a physical area, the graph including (i) multiple area nodes that represent regions of the area that are traversed by a set of actors that perform tasks in the area and (ii) multiple terminal nodes that represent regions of the facility where the actors perform the tasks. A set of agents that each include a model corresponding to an actor of the multiple actors is identified. At least a portion of the agents include models for robots that perform tasks in the area. The model of an agent represents durations of time for traversing area nodes and performing tasks are terminal nodes during simulations. A sequence of tasks being performed in the area is simulated using the graph and the set of agents for the set of actors. A set of performance metrics for performance of the sequence of tasks for the area is monitored based on the simulation. Control of one or more of the robots is adjusted based on the performance metrics.

Implementations may include one or more of the following features. Each agent can include a state machine that defines how the agent reacts to events. Simulating the sequence of tasks can include transitioning an agent from a first node to a second node; determining, based on the model for the agent, a duration of time that the agent will be in the second node; initializing a timer for the agent using the duration of time; and transitioning the agent from the second node to a third node when the timer elapses. Some aspects can include updating a timer for each other agent in the second node in response to the agent transitioning into the second node. Some aspects can include receiving, from an orchestrator, a message indicating that a second agent has entered the second node and, in response to the second agent entering the second node, updating the timer for the agent to account for interference to the agent caused by the second agent. Updating the timer can include updating the timer based on a type of the second agent and a direction of travel through the area node relative to the agent.

In some aspects, each agent is configured to request permission from an orchestrator to enter each node of the graph during the simulation. The model for a particular agent can include a distribution of durations of time for each task in a set of tasks. Some aspects can include determining that the agent has entered a given terminal node corresponding to a given task; sampling the distribution of durations for the given task to obtain a given duration; initializing a timer based on the given duration; determining that the timer has elapsed; and determining that the task has been completed in response to determining that the timer has elapsed.

In some aspects, adjusting the control of the one or more robots includes at least one of adjusting a navigation of the one or more robots about the area or adjusting a sequence in which the robots perform the tasks. In some aspects, the set of actors includes people that perform tasks in the area and the set of agents includes agents for the people of the facility.

The methods in accordance with the present disclosure can include any combination of the aspects and features described herein. That is, methods in accordance with the present disclosure are not limited to the combinations of aspects and features specifically described herein, but also may include any combination of the aspects and features provided.

The subject matter described in this specification can be implemented in particular embodiments so as to realize one or more of the following advantages. Simulation techniques described in this document can account for direct and indirect interactions between actors of an area, e.g., facility, to more accurately predict the amount of time required to complete tasks and to determine more efficient allocation and control of robots and other equipment, e.g., forklifts, in the area. The simulation techniques can account for the stochastic behavior of current robots and the interaction between multiple robots and other actors moving in the same area by sampling from distributions of area traversal times that are based on the quantity of actors in the area, the types of the actors, the direction of travel of the actors, and/or other information about the actors, providing more accurate simulation of the time taken for the various agents to move about the area. These more accurate travel times result in more accurate task completion times, which can be used to better control the robots, the sequence of tasks, the location at which tasks are completed, and/or the location at which objects for completing the tasks are placed. The results of the simulation can be directly used to adjust the navigation of robots about the area for completing tasks, adjust the allocation of robots for each task, adjust the allowed directionality of travel through segments of the area, and/or for other adjustments that improve the efficiency at which the robots complete tasks. These adjustments result in more efficient operation of the robots and reduced errors/damage caused by the robots, e.g., by reducing collisions or overheating due to congestion.

The simulation techniques can use a graph that represents the physical area and that includes area nodes that represent the various regions of the area and terminal nodes that represent the location at which tasks are performed. The simulation techniques can also use agents that represent the various actors that perform tasks or otherwise move about the area. The agent for an actor, e.g., robot or person, can include a state machine and model that defines how the actor traverses the area and performs tasks that is used in the simulation to determine/adjust the durations of traversing area nodes and performing tasks at terminal nodes. Creating models of agents separate from the graph representation provides modularity that simplifies the development and testing process of the simulator, makes the overall system flexible to configure, and improves scalability both in terms of area size and quantity of agents. It also enables the models for particular types of agents to be easily modified and for new agents for new types of actors (e.g., new types of robots) to be easily added to the system. This also enables the simulation of different types of actors and the different interactions between the various types of actors.

The simulation can exclude physics-based and/or low-level modeling such that the simulation can easily be time-scaled and ran more quickly than a real-time simulation without substantial impact to accuracy. Running the simulation in accelerated time is important for being able to quickly test a variety of site configurations, and adjust the configuration of the site and/or robots performing tasks at the site based on the results of the simulations. Using an orchestrator to maintain the state of the simulation and that has low overhead, e.g., computational overhead and processing time requirements, relative to the simulation time for segment traversals and task completions, significant time-scaling is possible without loss of accuracy.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
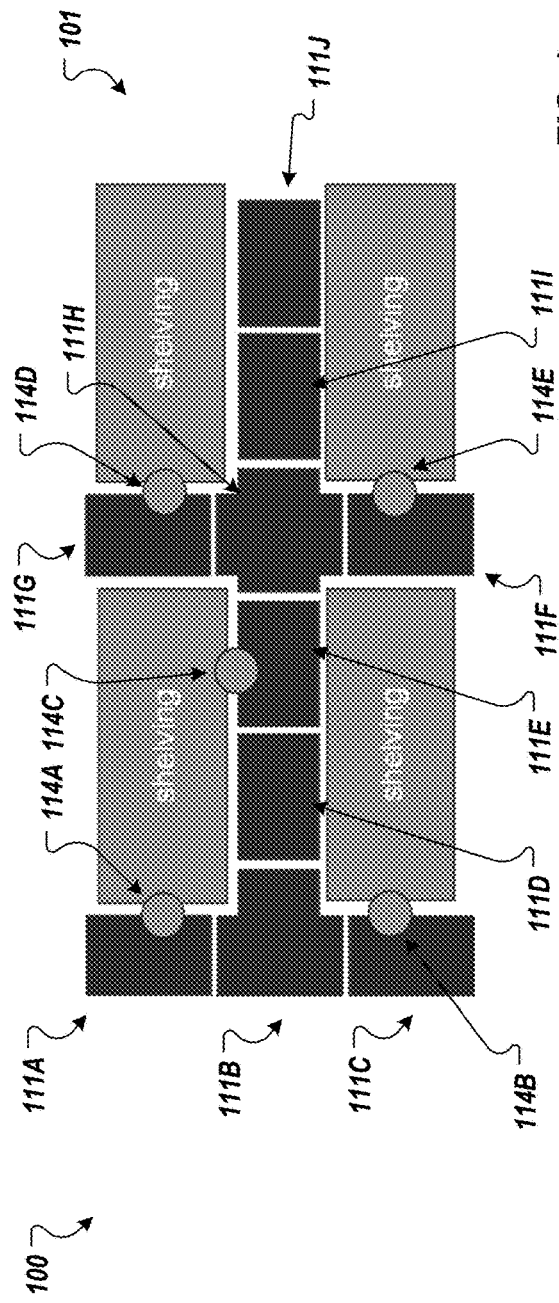
FIG. 1 shows a physical representation of an area in which robots navigate and complete tasks.

FIG. 1 shows a physical representation 100 of an area 101 in which robots navigate and complete tasks. In addition, other actors, e.g., people, forklifts, drones, construction vehicles, etc., can also navigate about and complete tasks in the area 101. In general, the area 101 can be a facility, e.g., an indoor facility such as a warehouse, manufacturing facility, hospital, data center, airport, or shopping mall. In another example, the area 101 can be an outdoor area such as a park, city, neighborhood, mining area, construction site, etc., or a combination of indoor and outdoor areas.

In the illustrated example, the area 101 is an indoor facility that includes shelving units and navigational regions 111A-111J of the area 101 through which agents, e.g., robots and/or humans, can pass. For example, the area 101 can be a warehouse that includes the shelving units that store items, and the navigational regions 111A-111J can be the areas between the shelving units in which robots, humans, and other actors can pass. In other areas, the navigational regions 111A-111J can include hallways, passageways, corridors, sidewalks, aisles, paths, or other areas that allow robots to navigate between various locations within the area 101. The navigational regions can also be referred to as regions in this document for brevity.

The physical representation 100 of the area 101 also includes tasks 114A-114E that are performed at locations within the area. In this example, each task 114A-114E is related to a shelving unit. For example, the task 114A can be placing an object on a shelf at the location where the task 114A is shown and the task 114C can be removing an object from a shelf at the location where is tasks 114C is shown.

In other types of areas, other tasks can be performed. For example, in a data center, the shelving units can be replaced with racks of computing equipment and the tasks can include adding or removing computing equipment, configuring a piece of computing equipment, powering on or off computing equipment, etc.

Figure 2:
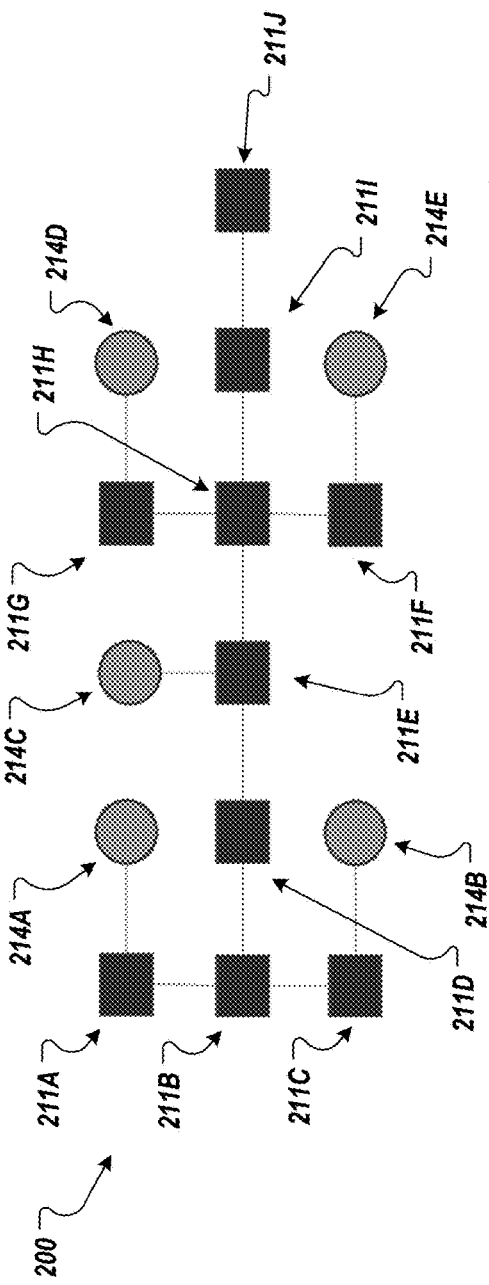
FIG. 2 shows a graphical representation of the area of FIG. 1.

The physical representation 100 of the area 101 can be used to generate a graph 200 of the area 101, as shown in FIG. 2. A simulation system, such as the simulation system 300 illustrated in FIG. 3, can simulate the movement of actors through an area using a graph of the area and agents that include models and/or state machines that define how actors traverse areas and perform tasks. The agents can include models for various actors, such as robot arms, mobile robots, people, forklifts, drones, construction vehicles, and/or other actors within an area. The graph can include nodes that represent regions of the area and tasks performed in the area, and edges between nodes. The simulation system can generate, or enable a user to generate, the graph 200 of the area 100, e.g., using the physical representation 100 of the area 101. The graph 200 can be a topological-based graph that represents the physical layout of the area 100, the transition points within the area 101, and the tasks performed in the area 101.

The graph 200 represents the physical layout of the area 101 and includes area nodes 211A-211J that represent navigational regions 111A-111J, respectively. Similarly, the graph 200 includes terminal nodes 214A-214E that represent the tasks 114A-114E, respectively. Area nodes and terminal nodes are the primary nodes of graphs used in the simulation of actors, such as robots, performing tasks in the area 101.

An area node can include, or be mapped to, data related to the region represented by the area node. This data for an area node can include data indicating the entry/exit points of the region, data identifying the other nodes (and corresponding regions) to which the entry/exit points connect, the navigational distance within the region between each entry point and exit point pair, the allowed direction(s) of travel between entry and exit points, and/or a maximum number of agents allowed in the area node at a time. For example, the area node 211B can include or be mapped to data that identifies entry points from area nodes 211A, 211C, and 211D, and exit points to area nodes 211A, 211C, and 211D. This data can also include the navigational distances between regions 111A and 111C through the region 111B represented by area node 211B, the navigational distances between regions 111A and 111D through the region 111B represented by area node 211B, and the navigational distances between regions 111C and 111D through the region 111B represented by area node 211B. The navigation distances can vary for different types of actors as the turn radii of actors can differ.

A terminal node can include, or be mapped to, data related to the task represented by the terminal node. The data for a terminal node can include an identifier for the task, the types of actors that can perform the task, any conditions that have to be met before the task can be performed and/or completed, and/or other appropriate information about a task.

An edge between two area nodes represents a transition between the navigation regions represented by the two area nodes. For example, the edge between area node 211A and 211B indicates that an actor can travel between the region 111A represented by node 211A and the region 111B represented by area node 211B. An edge can represent a single direction of travel, e.g., only from area node 211A to area node 211B which represents that an actor can only travel from the region 111A to 111B. An edge can also represent bidirectional travel, e.g., in both directions between regions 111A and 111B. Arrows on the edges and/or metadata for the graph 200 can indicate the direction(s) of travel between the area nodes connected by the edge.

An edge between an area node and a terminal node represents the corresponding region at which the task corresponding to the terminal node is performed. For example, the edge between area node 211A and terminal node 214A indicates that an actor would need to travel to the region 111A corresponding to the area node 211A to perform the task represented by terminal node 214A.

Importantly, in the graphs described in the document, the edges may not include a weight, e.g., a weight that represents a physical distance between the area represented by the nodes. The edges may also not include a duration for traversing the node or completing the task of the node. This makes the overall state space smaller and simpler to model and simulate, resulting in faster, more efficient simulations that require less computation power to complete. In addition, this makes the simulation more modular and more flexible as the agent models can determine their respective durations based on the models for the nodes.

The data for the various nodes can be stored at metadata for the graph 200, or in another appropriate way. The simulation system can use the graph 200 and the agents for the actors to simulate navigation of agents between the area nodes 211A-211J of the graph 200 and performance of the tasks of the terminal nodes 214A-214E of the graph 200, as described in more detail below with reference to FIGS. 3-5.

Figure 3:
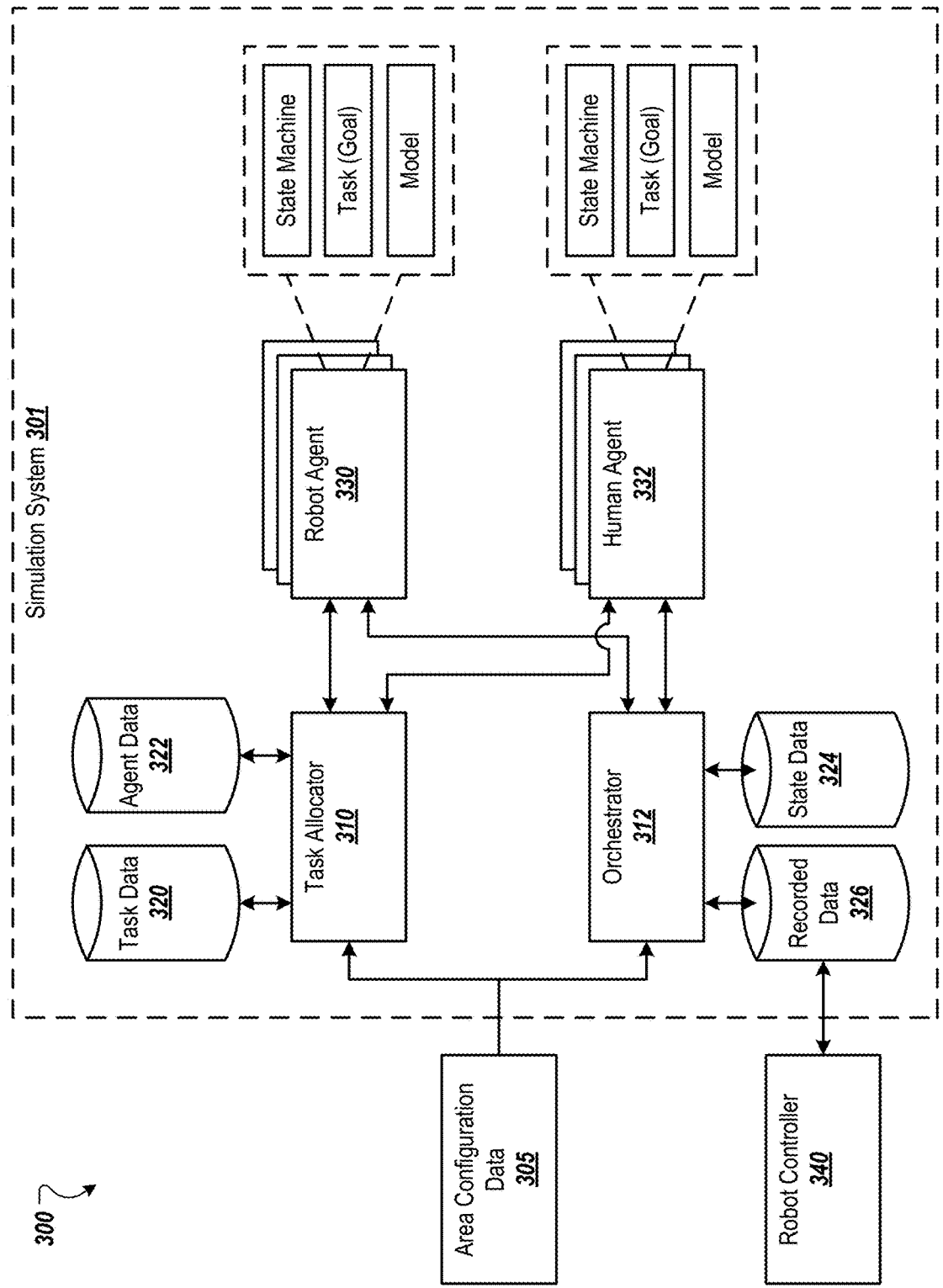
FIG. 3 shows an example environment in which a simulation system simulates robots performing tasks in an area.

FIG. 3 shows an example environment 300 in which a simulation system 301 simulates robots performing tasks in an area. The simulation system 301 includes a task allocator 310 and an agent orchestrator 312, each of which can be implemented in hardware and/or software. Both the task allocator 310 and the orchestrator 312 can receive area configuration data 305. The area configuration data 305 includes data related to an area for which a simulation of robots and optionally other actors is to be performed.

The area configuration data 305 can include a graph that includes area nodes, terminal nodes, edges between various nodes, and data for the various nodes, e.g., metadata for the nodes. For example, the area configuration data 305 can include a graph similar to the graph 200 of FIG. 2. The area configuration data 305 can also include data identifying agents for the actors for which the simulation will be performed, e.g., agents for the actors that will perform tasks at the physical area represented by the area configuration data 305. For example, this data can identify the types, models, and/or quantities of robots that will perform tasks, the quantity of people that will perform tasks, the type, models, and/or quantities of other equipment that will perform tasks, and optionally a list of tasks that each actor will perform or is capable of performing.

The task allocator 310 can include a list of tasks that are to be performed during a simulation. The list of tasks can be in the order in which the agents are to be simulated as performing the tasks during the simulation. The task allocator 310 can maintain task data 320 that includes the list of tasks and the status of the tasks, e.g., not started, in progress, or completed. The task allocator 310 can also access agent data 322 that indicates the tasks that each type of agent can perform.

During a simulation, the task allocator 310 can assign the tasks to the agents, e.g., based on the type of tasks that each agent is capable of performing and the location of each agent in the graph (e.g., the node in which the agent is located). For example, as described in more detail below, when an agent completes a task, the agent can request another task from the task allocator 310 or indicate to the task allocator 310 that the agent is available for another task.

The orchestrator 312 can manage the overall simulation and keep track of the overall state of the system being simulated. For example, the orchestrator 312 can maintain, in state data 324, data identifying the node location of each agent, the amount of time left on a timer for each agent for completing their current tasks, the quantity of agents and types of agents in each area node, the status of conditions that need to be met for a task to start or be completed, etc.

The orchestrator 312 can also control the transitioning between nodes of the agents. In some implementations, to transition between nodes, the agents are configured to request permission from the orchestrator 312, e.g., by sending messages to the orchestrator 312. The orchestrator 312 can provide permission to the agent, e.g., when the number of agents in the node to which the agent is transitioning is below its limit.

The orchestrator 312 can also monitor for and store recorded data 326 during the simulation. This recoded data 326 can be used to generate performance metrics, evaluate task/navigation completion times, evaluate congestion within area nodes, and/or replay the simulation in two dimensions or three dimensions. For example, the orchestrator 312 can record, for each task, a start time of the task, a completion time of the task, the total duration for completing the task, and/or the agent and/or type of agent that completed the task. The orchestrator 312 can also record, for each time an agent traverses an area node, the time at which the agent entered the area node, the time at which the agent exited the area node, the entry and exit points, the quantity of agents in the area node at the same time as the agent and, if the quantity changed, the duration of each quantity, the type of each agent in the node at the same time, and the direction of travel of each agent, e.g., same direction, opposite direction, orthogonal direction, or angle between the directions of the agent traversing the node and the other agent(s) in the area node.

The simulation system 301 can simulate various types of agents performing tasks in the area defined by the area configuration data 305. In this example, the simulation system 301 includes robot agents 330 and human agents 332. In other examples, the simulation system 301 can include forklift agents, drone agents, bulldozer agents, crane agents, and/or other types of agents for other types of actors that can perform tasks in an area.

Each agent can include a state machine, a task, and a model. The task can indicate a current task being performed by the agent or a task to which the agent is navigating across area nodes to perform. The state machine is a behavioral model that defines the behavior of the agent during the simulation, e.g., how the agent reacts to events. The state machine for each type of agent or each subtype can differ. For example, the state machine for a first type of robot can differ from the state machine for a second type of robot and both can differ from the state machine for a human agent.

Figure 4:
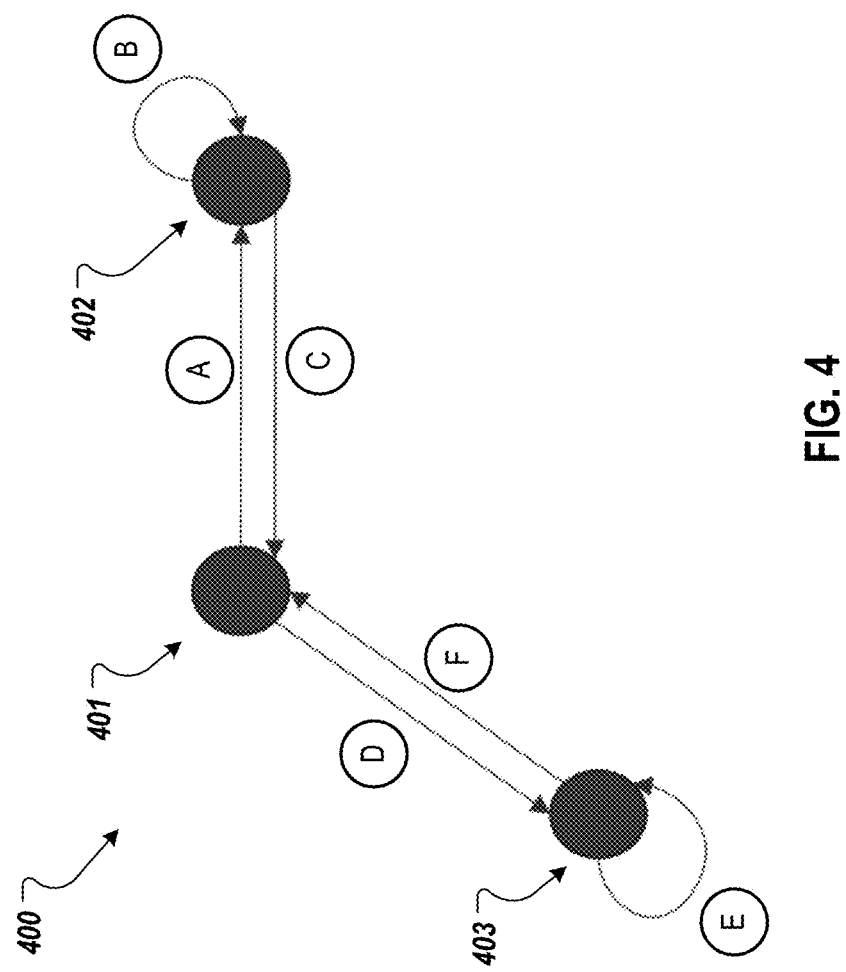
FIG. 4 shows an example state machine of an agent.

As an example, a state machine for an agent can include a set of states and conditions for transitioning between the states. An example, state may correspond to entering an area node. The state machine can include, for this state, an action to start a timer based on the duration of time it is expected for the actor corresponding to the agent to traverse the region corresponding to the area node. The timer can be a countdown timer (e.g., from the expected duration to zero) or a count up timer (e.g., from zero to the expected duration). The state can also include a condition that the timer elapses before transitioning to a next state. An example state machine is illustrated in FIG. 4 and described below.

The model for an agent defines how the agent performs based on circumstances or contextual data and can be based on empirical data associated with the actor represented by the agent. For each task, the model for an agent can define the expected duration to complete the task. This duration can be a specified duration, e.g., 10 minutes or a distribution of expected durations, e.g., between 8 minutes and twelve minutes. If a distribution is used, the agent can sample the distribution for use in its timer when the agent reaches the terminal node corresponding to the task. The agent can sample a duration randomly or pseudorandomly.

For area nodes, the model for an agent can define the expected duration to traverse the area node based on additional contextual data. The model can specify a speed of the actor corresponding to the agent that can be used to determine the duration of time it would take the actor to traverse the physical distance between an entry point and exit point of a region. The model for a given agent can also account for the quantity and types of agents in the same area node and the direction of travel of the given agent relative to the direction of travel of the other agent(s) in the area node.

If no other agents are in the same area node, the duration of time to traverse the area node can be based on the physical distance between the entry and exit point and the speed defined by the model. In another example, the agent can sample from a distribution of durations in a similar manner as for task time durations.

The model can also define adjustments to the durations and/or different distributions of durations based on the type of agent(s) in the same area node and/or the quantity of other agent(s) in the same area node. For example, the model can include a distribution of time durations for each possible set of circumstances, e.g., each possible combination of agents in the same area node as the given agent. In another example, the model can define adjustments to the duration corresponding to there being no other agents in the same area node. In this example, the adjustment can be to add 10% more time for each additional agent or a progressive scale with increasing percentages as the number of other agents in the same area node increases.

The adjustments and/or distributions of time durations can also be based on the direction of travel of the other agents. If another agent is traveling in the same direction as the given agent, then it is unlikely that the other agent will slow down the given agent so there may be no adjustment for same direction agents. If another agent is traveling in the opposite direction of the given agent, the interference may be greatest and therefore the adjustment to the duration or the distribution of durations may be greater than other situations. As an example, the adjustment for an agent that is in the same area node but traveling orthogonal to the direction of the given agent may cause less interference on the given agent than opposite direction agents. Thus, the increase in time for the given agent to traverse an area node with an orthogonal direction traveling agent may be less than the increase in time for an opposite direction traveling agent.

Using different durations or distributions of durations based on the quantity of agents in the same area node and their direction of travel enables the simulation system 301 to more accurately simulate the indirect interactions between agents, such as congestion and bottlenecks in aisles, passageways, and other areas in which actors travel to perform tasks. As actors often have to travel between various regions to perform tasks, this results in more accurate simulations of actors performing tasks in a facility or other area in which robots, people, and/or other actors perform tasks.

In some implementations, the durations or distributions of durations can be based on the other agents in the same area node and the physical dimensions, e.g., width, of the aisle or passageway represented by the area node. For example, wider aisles may result in less interference and therefore less increases in time durations when other agents are present in the area node.

At the beginning of a simulation, the task allocator 310 can assign each agent a task from the list of tasks to be completed during the simulation. The orchestrator 312 can assign each agent to a respective node of the graph. Assuming each agent has an assigned task, the orchestrator 312 can put each agent in the terminal node corresponding to the assigned task.

During the simulation, the agents traverse the graph based on their assigned tasks. While performing a task, the agent uses a timer to simulate the time it would take the actor corresponding to the agent to complete the task using its state machine and model, as described above. When the timer elapses, the task is considered complete and the agent's state machine can transition to the next state. The next state can be to request another task from the task allocator 310. The task allocator 310 can provide, to the agent, data identifying the next task and the terminal node corresponding to the next task. The agent can determine a path through the graph to the terminal node for the next task. Each agent can include a map corresponding to the graph of the area and a path finding engine that determines a path through the graph from the current terminal node to the terminal node corresponding to the next task. For example, if an agent is located in terminal node A and is assigned a task at terminal node D, the agent will find a path from traverse the graph from terminal node A to terminal node D.

In some implementations, each agent can be configured to request permission from the orchestrator 312 to enter a node. This request can be in the form of a message that includes, the current node of the agent, the next node to which the agent is requesting permission to transition, and where the agent will exit the next node (e.g., data identifying the subsequent node to which the agent will transition when it exits the next node). The orchestrator 312 can receive the request and determine whether the limit of agents in the node to which the agent is requesting to transition is already met. If not, the orchestrator 312 can grant the agent permission to enter the node, e.g., by sending a message to the agent.

When the agent receives permission to enter an area node, the state machine of the agent can transition to a state corresponding to entering a node. This state can include an action to start a timer for traversing the area node. This timer can be based on the duration of time for the actor corresponding to the agent to traverse the region corresponding to the area node, as described above.

When an agent enters an area node, a notification can be sent to each agent that is in the area node. For example, the agent that entered the area node or the orchestrator 312 can send the notification. In this way, each agent can update their timer to account for the updated quantity of agents in the area node. Similarly, when an agent exits an area node, a notification can be sent to each agent in the area node so that they can update their timers to account for the reduction in the quantity of agents in the area node. The combination of the requirement to request permission to enter nodes with the notifications enables the simulation system 301 to model interactions and events not previously possible, such as congestion or bottlenecks in an aisle.

When an agent receives a notification that another agent entered or left the area node, the agent can update its timer to account for the adjusted quantity of other agents in the area node. For example, if another agent traveling in a different direction than the agent exited the area node, the agent can reduce the amount of time that the agent has to spend in the area node (e.g., by reducing an amount of time left on a countdown timer) as there is now less congestion in the area node as experienced by the agent. Similarly, if another agent traveling in a different direction than the agent enters the area node, the agent can increase the amount of time that the agent has to spend in the area node (e.g., by increasing an amount of time left on a countdown timer) as there is now more congestion in the area node as experienced by the agent.

If distributions of durations are used for the timer, the agent can sample from the distribution of durations corresponding to the quantity and type of agents currently present in the area node. The agent can determine a difference between this sampled duration and an initial duration used to initialize the timer when the agent entered the area node. If the agent is updating a countdown timer in response to an agent leaving the area node, the agent can subtract the difference from the current time of the timer. If the agent is updating the countdown timer in response to an agent entering the area node, the agent can add the difference to the current time of the timer.

For each area node that an agent traverses, the agent can initialize its timer and update the timer as needed based on other agents entering and/or exiting the area node. Once the agent reaches its target terminal node for its assigned task, the agent can initialize a timer based on the duration of time required for the agent to perform the task. If a task has one or more conditions of other agents, the agent may have to wait for these conditions to be satisfied before initializing the timer or determining that the task has been completed. When the task is complete, the agent can request another task from the task allocator 310.

As described above, the orchestrator 312 can monitor the simulation and maintain the overall state of the graph and agents during the simulation. The orchestrator 312 can also determine when the simulation is complete, e.g., when all tasks have been completed, and end the simulation.

Using the models and state machines of the agents during the simulation, the durations of time for completing tasks and traversing regions of an area can accurately account for direct and indirect interaction between the agents without the requirement of physics-based or lower-level modeling. By not requiring physics-level calculations for such durations, the durations can be calculated and updated more quickly, allowing for more accelerated simulations without loss of simulation accuracy. Using an orchestrator that has low overhead for maintaining small amounts of state data and responding to agent requests results in faster decisions and calculations by the orchestrator in comparison to the overall simulation time, which also allows for faster simulations without loss of accuracy.

A robot controller 340 can access the recorded data 326 for the simulation and optionally multiple simulations. For example, the simulation system 301 can perform multiple simulations in parallel using different configurations, e.g., different locations within the graph to perform tasks, different navigation patterns (e.g., different directionality between area nodes), different quantities and/or types of agents, etc.

The robot controller 340 can compute various performance metrics based on the recorded data 326. For example, the robot controller 340 can compute the quantity of tasks performed by each agent, the total quantity of tasks performed by all agents during the simulation, the utilization of each agent, the aggregate utilization of all agents, the amount of time each agent spent waiting for conditions to be met for each task or overall among all tasks, the amount of delay caused by congestion at each node, the total amount of delay caused by congestion across all nodes, the average amount of time for each task to be performed, and/or other appropriate performance metrics.

The robot controller 340 can compare the performance metrics across multiple simulation of variations of the same area, e.g., using different area configuration data 305 including different graphs and/or different configurations of agents for the same physical area.

The robot controller 340 can determine adjustments to the control of the agents that would improve the performance metrics. For example, if a particular node has higher congestion than other nodes, the robot simulation system can reroute agents around that node or determine a different sequence of tasks such that fewer agents are in the node at the same time. By reducing the delay in navigating robots through various areas, idling times of robots can be reduced resulting in less wasted computational resources and less wasted power consumption for the robots.

In another example, if the congestion is low but the total number of tasks is also low, the robot controller 340 can determine to activate additional robots (or recommend acquiring additional robots) to increase the number of tasks completed. The robot controller 340 can perform updated simulations based on the determined changes, e.g., to confirm that the changes would result in improvements.

The robot controller 340 can then make adjustments to the control of robots, the sequence of robots, tasks, and/or other actors in performing tasks, the navigation of the actors in the navigational regions, and/or the placement of items required to perform tasks (e.g., tools and/or inventory) within the physical area. For example, the simulation(s) of the area may indicate that a particular area node is experiencing higher congestion than other area nodes based on longer traversal times although the physical distance of the region corresponding to the particular area node is not significantly greater than the physical distances of the other regions. In this example, the robot controller 340 can adjust the control of robots to take a different path between the regions of the physical area to avoid the region corresponding to the area node that has congestion. The robot controller 340 can transmit, to a robot, instructions that cause the robot to take the different path or to avoid the region.

Reducing robot congestions in a limited space can avoid damage to robots and enable the robots to perform their tasks more efficiently. For example, reducing the congestion of robots in an area can avoid robot collisions, increased temperatures in the areas, and increased workloads on sensors (e.g., object detection and object avoidance sensors) of the robots in the limited spaces.

In another example, the robot controller 340 can configure a path finder component of the actual robot (not the agent for the robot) to compute alternate routes that do not require the robot to pass through the congested region. To do so, the robot controller 340 can transmit, to a robot, an update for its path finder component along with instructions that cause the robot to update its path finder component.

In another example, the robot controller 340 can adjust the sequence of tasks performed by the actors in a way that better distributes the traversal of the congested region throughout the duration of the performance of the tasks. For example, if the simulation indicates that the area node gets congested at times, but is not always congested based on varying traversal times, the robot controller 340 can reconfigure the sequence of tasks to better distribute the actors traversal of the region.

The robot controller can also adjust the allocation of robots, the sequence of tasks performed by the actors, and/or the routing of the actors to improve the utilization of each actors, the aggregate utilization of all actors, and/or the amount of time each actor spends waiting for conditions to be met for each task or overall among all tasks. For example, the amount of time waiting for a condition to be met by another actor is high, the robot controller 340 can allocate more robots to performing the tasks for meeting the condition, adjust the sequence of tasks to complete these conditions faster, and/or adjust the navigation of the actors to faster paths that result in faster completion of the tasks.

In another example, the robot controller 340 can adjust the directionality of the region corresponding to the congested area node for the robots. For example, the robot controller 340 can configure a region to only allow one way traffic. For robots, this can include configuring the robot, e.g., its path finder component, to disable navigating that region in the blocked direction.

Prior to making any changes, the robot controller 340 can update the area configuration data to simulate the changes using a graph and agents that are configured based on the changes. In this way, the robot controller 340 can test the changes to ensure that the changes result in improvements prior to making the changes in the physical space.

The robot controller 340 can also cause the robots to reconfigure the location of items within the area to make task performance more efficient. For example, the robot controller 340 can use the recorded time data for multiple simulations to determine that a particular task is performed faster when items are located in area nodes corresponding to particular regions of the area. In this example, the robot controller 340 can control the robots to move these items to those particular regions for completion of the actual tasks.

In another example, the robot controller 340 can reallocate robots and/or other actors based on the simulation(s). For example, if the simulation indicates that the set of tasks is performed faster with more robots overall or more robots focused on a subset of tasks, the robot controller 340 can allocate more robots to the overall system or to the subset of tasks.

The robot controller 340 can also generate a visual playback of the simulation so that a system designer or other user can watch the playback of the simulation. For example, the robot controller 340 can generate the playback based on the time information recorded for each task and for each area node traversal. The playback can show dots or other visual elements that represent the agents moving along the nodes of the graph and remaining stationary at terminal nodes while performing tasks. This playback can enable the user to see situations in which many agents are in the same area node at the same time to better assess bottlenecks and congestion in the various regions of the area being simulated.

The simulation techniques described this document allow for the modeling and monitoring of task interference and task dependency. A task interference example is congestion during navigation through area nodes. As described above, when additional agents enter an area node, each agent in the area node updates its timer, e.g., by adding more time that will be required to traverse the area node. This models congestion caused by increasing numbers of robots and/or people in an area. By monitoring the amount of time that agents spend in the area nodes during simulations, the amount of task interference can be captured. For example, the results of the simulation can show that the average time taken to traverse an area node is higher than other area nodes because the average number of agents traversing the node at the same time is higher.

A task dependency example is waiting for a person to deliver an object to a robot at a terminal node. By including conditions for tasks as part of the terminal nodes, the task dependencies are captured in the simulations. The results of these task dependencies can also be monitored during the simulations. For example, the average amount of time robot agents have to wait for an object to be delivered at a terminal node can be determined during or after a simulation.

In some implementations, task dependencies are part of agent models. These models can define how agents response to the task dependencies of other agents. This allows a first agent to respond to a task dependency of a second agent when the second agent enters the same terminal node as the first agent or when the first agent enters a terminal node in which the second agent is already present.

FIG. 4 shows an example state machine 400 of an agent. This example state machine has three states 401-403 although more states are also possible. The state 401 can be considered a default state in which the agent is waiting for a task or waiting for permission to enter a different area node or terminal node. The state 402 is the state of the agent when the agent is in an area node and the state 403 is the state of the agent when the agent is in a terminal node.

In stage A, when the agent transitions into an area node, the agent starts a timer based on the duration of time for the actor corresponding to the agent to traverse the region corresponding to the area node. As described above, this duration can be based on the model of the agent, the number of other agents in the area node, etc. Stage B occurs when another agent enters or leaves the area node. As described above, the other agent or the orchestrator 312 can notify each agent in an area node when another agent enters or exits the area node. In stage B, the agent updates the timer to account for the updated quantity of agents in the area node.

Stage C occurs when the agent's timer elapses. In stage C, when the agent detects that its timer has elapsed, the agent can request to enter the next area node that is along the path to its target terminal node for the agent's next task.

In stage D, when the agent transitions into a terminal node, the agent starts a timer based on the duration of time for the actor corresponding to the agent to complete the task corresponding to the terminal node. This duration can also be based on the model of the agent, the number of other agents in the terminal node, conditions for the task, etc. Stage E occurs when another agent enters the terminal node. In stage E, the agent evaluates the interaction with the other agent. For example, the task being completed by the agent can include a condition that the other agent provides an item for completing the task. In this example, the agent can determine, based on the evaluation, that the agent now has the required item and that the condition is satisfied.

Stage F occurs when the agent's timer elapses. In stage F, when the agent detects that its timer has elapsed, the agent determines that the task is complete and returns to the default state 402.

Figure 5:
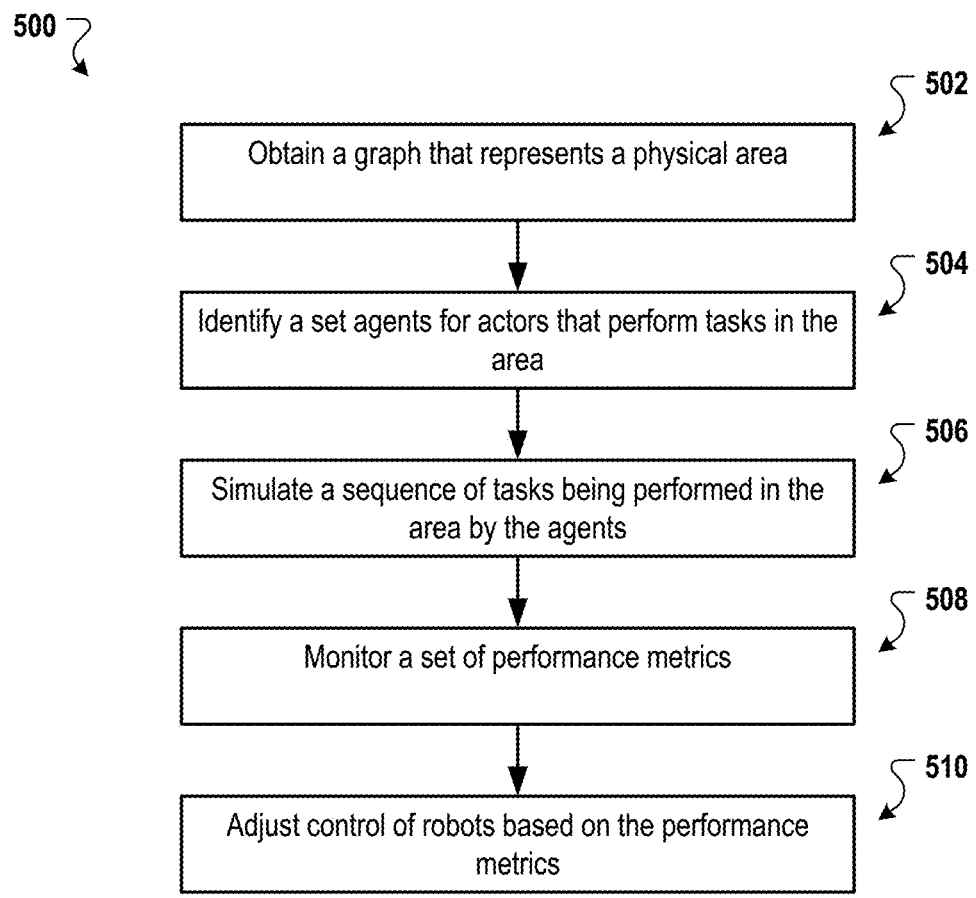
FIG. 5 is a flow diagram of an example process for performing a simulation of robots completing tasks within an area.

FIG. 5 is a flow diagram of an example process 500 for performing a simulation of robots completing tasks within an area. The process 500 can be performed by the simulation system 301 of FIG. 3. Operations of the process 500 can also be implemented as instructions stored on one or more computer readable media which may be non-transitory, and execution of the instructions by one or more data processing apparatus can cause the one or more data processing apparatus to perform the operations of the process 500. For brevity, the process 500 is described as being performed by the simulation system 301.

The simulation system obtains a graph that represents a physical area for which tasks are to be simulated (502). For example, the simulation system can receive, e.g., from another system or user interface, data specifying the graph. In another example, the simulation system can generate the graph from a physical representation, e.g., images or a three-dimensional model, of the physical area. The graph can include area nodes, terminal nodes, and edges between at least some of the nodes. For example, the graph can be similar to the graph 200 of FIG. 2.

The simulation system identifies a set of agents for a set of actors that perform tasks in the area (504). The actors can include robots, people, and/or other equipment, as described above. Each agent can include a state machine and model that is based on the actor represented by the agent. The simulation system can identify the set of agents based on metadata for the graph or based on a list of actors for the physical area.

The simulation system simulates a sequence of tasks being performed in the area using the graph and the identified agents (506). As described above, the simulation can include assigning tasks to the agents and allowing the agents to traverse the graph to navigate between terminal nodes at which the tasks are performed. While in each area node and terminal node, the agent can initialize a timer based on its model and remain in the node until the timer elapses. The agent can also update its timer in response to events, e.g., in response to other agents entering or exiting the node that the agent is currently in or in response to conditions of the tasks that the agent is performing being met.

When the timer elapses while in an area node, the agent can request permission to enter the next node along the agent's path through the graph to the next terminal node. If granted, the agent can transition to the next node and initialize a timer for that node. When the timer elapses while in a terminal node, the agent can request another task. In response to receiving a new task, the agent can find a path to the terminal node corresponding to the new task using the graph or a map based on the graph. The agent can then start moving from area node to area node along the path until arriving at the terminal node. Upon arrival, the agent can initialize a timer for the new task.

The simulation system monitors performance metrics and/or data that can be used to generate performance metrics during the simulation (508). As described above, these performance metrics can include the quantity of tasks performed by each agent, the total quantity of tasks performed by all agents during the simulation, the utilization of each agent, the aggregate utilization of all agents, the amount of time each agent spent waiting for conditions to be met for each task or overall among all tasks, the amount of delay caused by congestion at each node, the total amount of delay caused by congestion across all nodes, the average amount of time for each task to be performed, and/or other appropriate performance metrics.

The simulation system adjust the control of one or more robots based on the performance metrics (510). As described above, this can include changing the way the robots navigate the physical area, adjusting the sequence in which the robots perform tasks, adjusting the location at which the robots store items for completing tasks, adjusting the direction of travel of the robots in particular regions of the area, etc.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
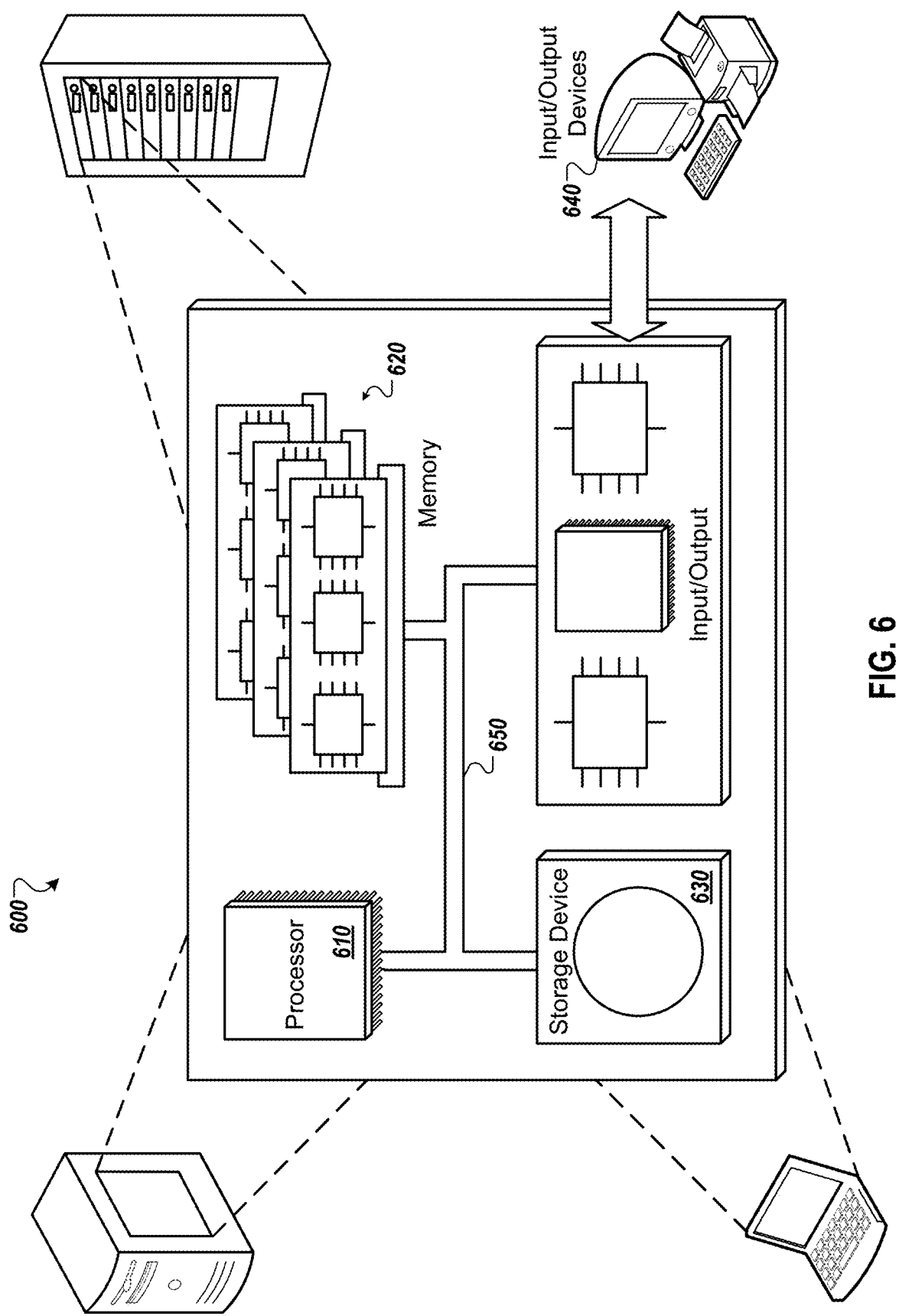
FIG. 6 is a block diagram of a computing system that can be used in connection with computer-implemented methods described in this document.

An example of one such type of computer is shown in FIG. 6, which shows a schematic diagram of a computer system 600. The system 600 can be used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/ output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    obtaining a graph representing a physical area, the graph comprising (i) a plurality of area nodes that represent regions of the area that are traversed by a set of actors that perform tasks in the area, (ii) a plurality of terminal nodes that represent regions of the facility where the actors perform the tasks, and (iii) edges between the nodes;
    identifying a set of agents that each comprise a model corresponding to an actor of the plurality of actors, wherein at least a portion of the agents comprise models for robots that perform tasks in the area, and wherein the model of an agent represents durations of time for traversing area nodes and performing tasks at terminal nodes during simulations;
    simulating a sequence of tasks being performed in the area using the graph and the set of agents for the set of actors, wherein simulating the sequence of tasks comprises:
        transition an agent from a first node to a second node
        determining, based on the model for the agent, a duration of time that the agent will be in the second node
        initializing a timer for the agent using the duration of time
        causing the agent to remain in the second node until the timer elapses; and
        transitioning the agent from the second node to a third node when the time elapses;
    monitoring, based on the simulation, a set of performance metrics for performance of the sequence of tasks for the area; and
    adjusting control of one or more of the robots based on the performance metrics.

2. The computer-implemented method of claim 1, wherein each agent comprises a state machine that defines how the agent reacts to events.

3. The computer-implemented method of claim 1, further comprising updating a timer for each other agent in the second node in response to the agent transitioning into the second node.

4. The computer-implemented method of claim 1, further comprising:
    receiving, from an orchestrator, a message indicating that a second agent has entered the second node; and
    in response to the second agent entering the second node, updating the timer for the agent to account for interference to the agent caused by the second agent.

5. The computer-implemented method of claim 4, wherein updating the timer comprises updating the timer based on a type of the second agent and a direction of travel through the area node relative to the agent.

6. The computer-implemented method of claim 1, wherein each agent is configured to request permission from an orchestrator to enter each node of the graph during the simulation.

7. The computer-implemented method of claim 1, wherein the model for a particular agent comprises a distribution of durations of time for each task in a set of tasks, the method further comprising:
    determining that the agent has entered a given terminal node corresponding to a given task;
    sampling the distribution of durations for the given task to obtain a given duration;
    initializing a timer based on the given duration;
    determining that the timer has elapsed; and
    determining that the task has been completed in response to determining that the timer has elapsed.

8. The computer-implemented method of claim 1, wherein adjusting the control of the one or more robots comprises at least one of adjusting a navigation of the one or more robots about the area or adjusting a sequence in which the robots perform the tasks.

9. The computer-implemented method of claim 1, wherein the set of actors comprises people that perform tasks in the area and the set of agents comprises agents for the people of the facility.

10. The computer-implemented method of claim 1, wherein an edge between two area nodes represents a transition between the regions represented by the two area nodes, and an edge between an area node and a terminal node represents the corresponding region at which the task corresponding to the terminal node is performed.

11. A system, comprising:
    one or more computers; and
    one or more computer memory devices interoperably coupled with the one or more computers and having tangible, non-transitory, machine-readable media storing one or more instructions that, when executed by the one or more computers, perform operations comprising:
- obtaining a graph representing a physical area, the graph comprising (i) a plurality of area nodes that represent regions of the area that are traversed by a set of actors that perform tasks in the area, (ii) a plurality of terminal nodes that represent regions of the facility where the actors perform the tasks, and (iii) edges between the nodes;
- identifying a set of agents that each comprise a model corresponding to an actor of the plurality of actors, wherein at least a portion of the agents comprise models for robots that perform tasks in the area, and wherein the model of an agent represents durations of time for traversing area nodes and performing tasks at terminal nodes during simulations;
- simulating a sequence of tasks being performed in the area using the graph and the set of agents for the set of actors, wherein simulating the sequence of tasks comprises:
  - transition an agent from a first node to a second node
  - determining, based on the model for the agent, a duration of time that the agent will be in the second node
  - initializing a timer for the agent using the duration of time
  - causing the agent to remain in the second node until the timer elapses; and
  - transitioning the agent from the second node to a third node when the time elapses;
  - monitoring, based on the simulation, a set of performance metrics for performance of the sequence of tasks for the area; and
  - adjusting control of one or more of the robots based on the performance metrics.

12. The system of claim 11, wherein each agent comprises a state machine that defines how the agent reacts to events.

13. The system of claim 11, wherein the operations comprise updating a timer for each other agent in the second node in response to the agent transitioning into the second node.

14. The system of claim 11, wherein the operations comprise:
- receiving, from an orchestrator, a message indicating that a second agent has entered the second node; and
- in response to the second agent entering the second node, updating the timer for the agent to account for interference to the agent caused by the second agent.

15. The system of claim 14, wherein updating the timer comprises updating the timer based on a type of the second agent and a direction of travel through the area node relative to the agent.

16. The system of claim 11, wherein each agent is configured to request permission from an orchestrator to enter each node of the graph during the simulation.

17. The system of claim 11, wherein the model for a particular agent comprises a distribution of durations of time for each task in a set of tasks, the operations further comprising:
- determining that the agent has entered a given terminal node corresponding to a given task;
- sampling the distribution of durations for the given task to obtain a given duration;
- initializing a timer based on the given duration;
- determining that the timer has elapsed; and
- determining that the task has been completed in response to determining that the timer has elapsed.

18. The system of claim 11, wherein adjusting the control of the one or more robots comprises at least one of adjusting a navigation of the one or more robots about the area or adjusting a sequence in which the robots perform the tasks.

19. The system of claim 11, wherein an edge between two area nodes represents a transition between the regions represented by the two area nodes, and an edge between an area node and a terminal node represents the corresponding region at which the task corresponding to the terminal node is performed.

20. A non-transitory, computer-readable medium storing one or more instructions executable by a computer system to perform operations comprising:
- obtaining a graph representing a physical area, the graph comprising (i) a plurality of area nodes that represent regions of the area that are traversed by a set of actors that perform tasks in the area, (ii) a plurality of terminal nodes that represent regions of the facility where the actors perform the tasks, and (iii) edges between the nodes;
- identifying a set of agents that each comprise a model corresponding to an actor of the plurality of actors, wherein at least a portion of the agents comprise models for robots that perform tasks in the area, and wherein the model of an agent represents durations of time for traversing area nodes and performing tasks at terminal nodes during simulations;
- simulating a sequence of tasks being performed in the area using the graph and the set of agents for the set of actors, wherein simulating the sequence of tasks comprises:
  - transition an agent from a first node to a second node
  - determining, based on the model for the agent, a duration of time that the agent will be in the second node
  - initializing a timer for the agent using the duration of time
  - causing the agent to remain in the second node until the timer elapses; and
  - transitioning the agent from the second node to a third node when the time elapses;
  - monitoring, based on the simulation, a set of performance metrics for performance of the sequence of tasks for the area; and
  - adjusting control of one or more of the robots based on the performance metrics.

21. The non-transitory, computer-readable medium of claim 20, wherein an edge between two area nodes represents a transition between the regions represented by the two area nodes, and an edge between an area node and a terminal node represents the corresponding region at which the task corresponding to the terminal node is performed.

* * * * *